US011857934B2

(12) United States Patent
Koyama et al.

(10) Patent No.: US 11,857,934 B2
(45) Date of Patent: Jan. 2, 2024

(54) VISCOUS MATERIAL STIRRING APPARATUS AND VISCOUS MATERIAL STIRRING METHOD

(71) Applicant: KAWASAKI JUKOGYO KABUSHIKI KAISHA, Kobe (JP)

(72) Inventors: Masataka Koyama, Kako-gun (JP); Satoru Yamasumi, Itami (JP); Shinsuke Hamatani, Nishinomiya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 976 days.

(21) Appl. No.: 16/643,747

(22) PCT Filed: Aug. 8, 2018

(86) PCT No.: PCT/JP2018/029758

§ 371 (c)(1),
(2) Date: Mar. 2, 2020

(87) PCT Pub. No.: WO2019/044437

PCT Pub. Date: Mar. 7, 2019

(65) Prior Publication Data

US 2020/0276548 A1 Sep. 3, 2020

(30) Foreign Application Priority Data

Aug. 30, 2017 (JP) ................................ 2017-165809

(51) Int. Cl.
*B01F 35/32* (2022.01)
*B01F 35/221* (2022.01)
(Continued)

(52) U.S. Cl.
CPC ........ *B01F 35/3204* (2022.01); *B01F 35/221* (2022.01); *B01F 35/754* (2022.01); *B01F 2101/36* (2022.01)

(58) Field of Classification Search
CPC .. B01F 35/3204; B01F 35/221; B01F 35/754; B01F 2101/36; B01F 33/5022;
(Continued)

(56) References Cited

U.S. PATENT DOCUMENTS 3,271,492 A * 9/1966 Elmendorf ............. B28B 1/525 264/122
4,023,776 A * 5/1977 Greten ..................... B27N 3/14 366/153.2
(Continued)

FOREIGN PATENT DOCUMENTS

JP H06-269720 A 9/1994
JP H08-277381 A 10/1996
WO WO-2019044437 A1 * 3/2019 ........ B01F 15/00331

*Primary Examiner* — Charles Cooley
(74) *Attorney, Agent, or Firm* — Oliff PLC

(57) ABSTRACT

A viscous material stirring apparatus includes a stirring member that rotates about a rotation axis and has a tip radially separated from the rotation axis, a rotary actuator that rotates the stirring member about the rotation axis, a moving mechanism that moves the stirring member, and a control device. The control device drives the moving mechanism to immerse the tip of the stirring member into an applied viscous material, drives the rotary actuator to rotate the stirring member around the rotation axis, and drives the moving mechanism to move the stirring member along a coating direction of the viscous material with the tip of the stirring member immersed in the viscous material.

5 Claims, 6 Drawing Sheets

(51) Int. Cl.
*B01F 35/75* (2022.01)
*B01F 101/36* (2022.01)

(58) Field of Classification Search
CPC ......... B01F 27/1121; B05D 1/40; B05D 1/26; B05C 5/02; B05C 5/0204; B05C 5/00; B05C 9/12; B05C 11/00
USPC ............................................... 366/153.2, 241
See application file for complete search history.

(56) References Cited

U.S. PATENT DOCUMENTS 5,478,148 A * 12/1995 Thomas .................. B01F 27/95
366/241
2016/0074900 A1* 3/2016 Okamoto ................. B05D 1/26
118/620
2017/0106397 A1 4/2017 Akaishi et al.

* cited by examiner

[FIG. 1A]
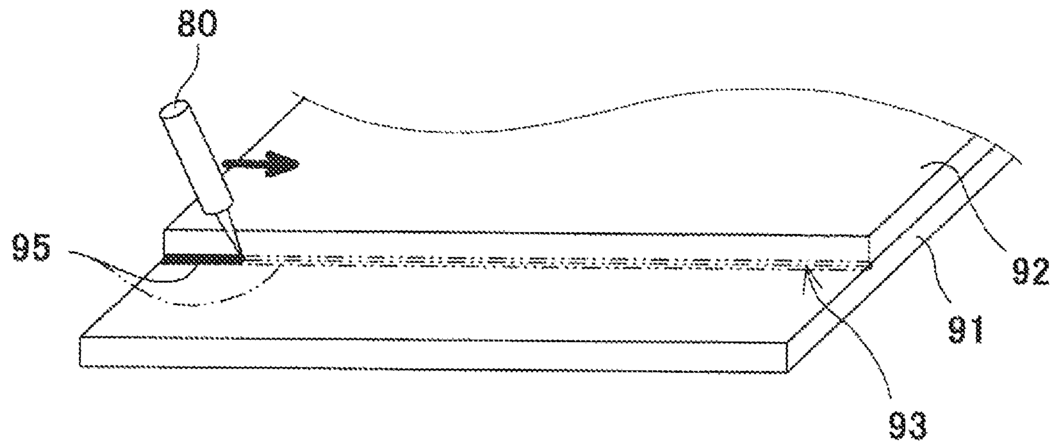
[FIG. 1B]
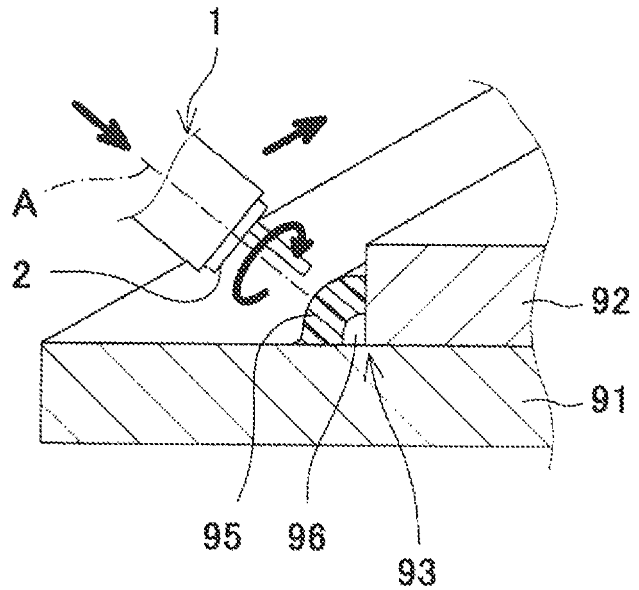

[FIG. 2]
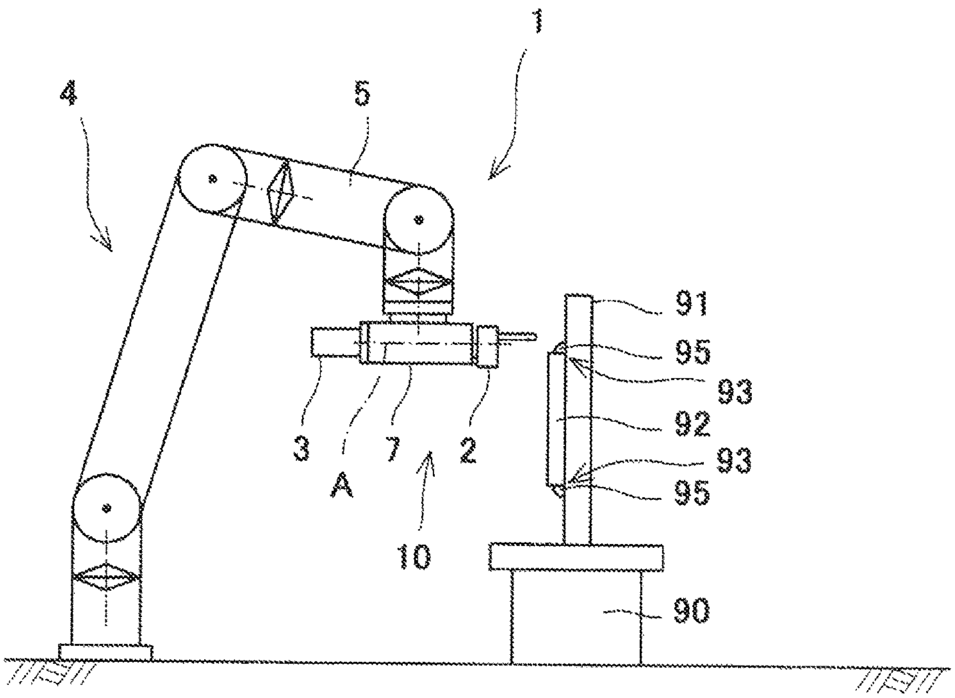
[FIG. 3]
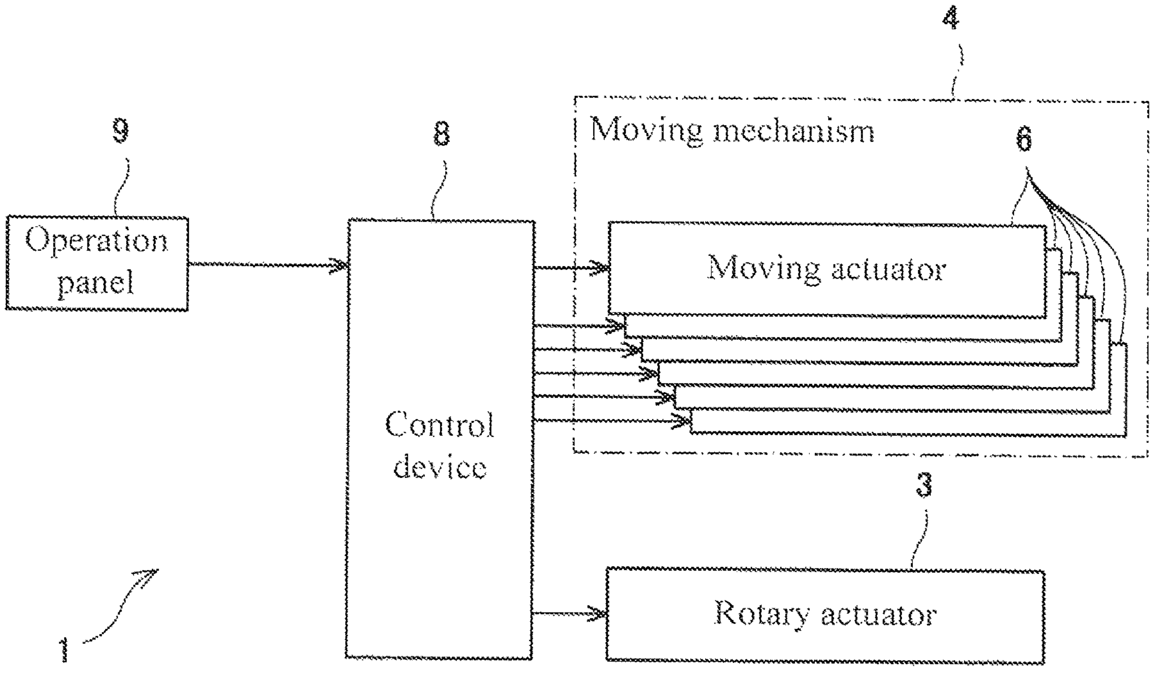

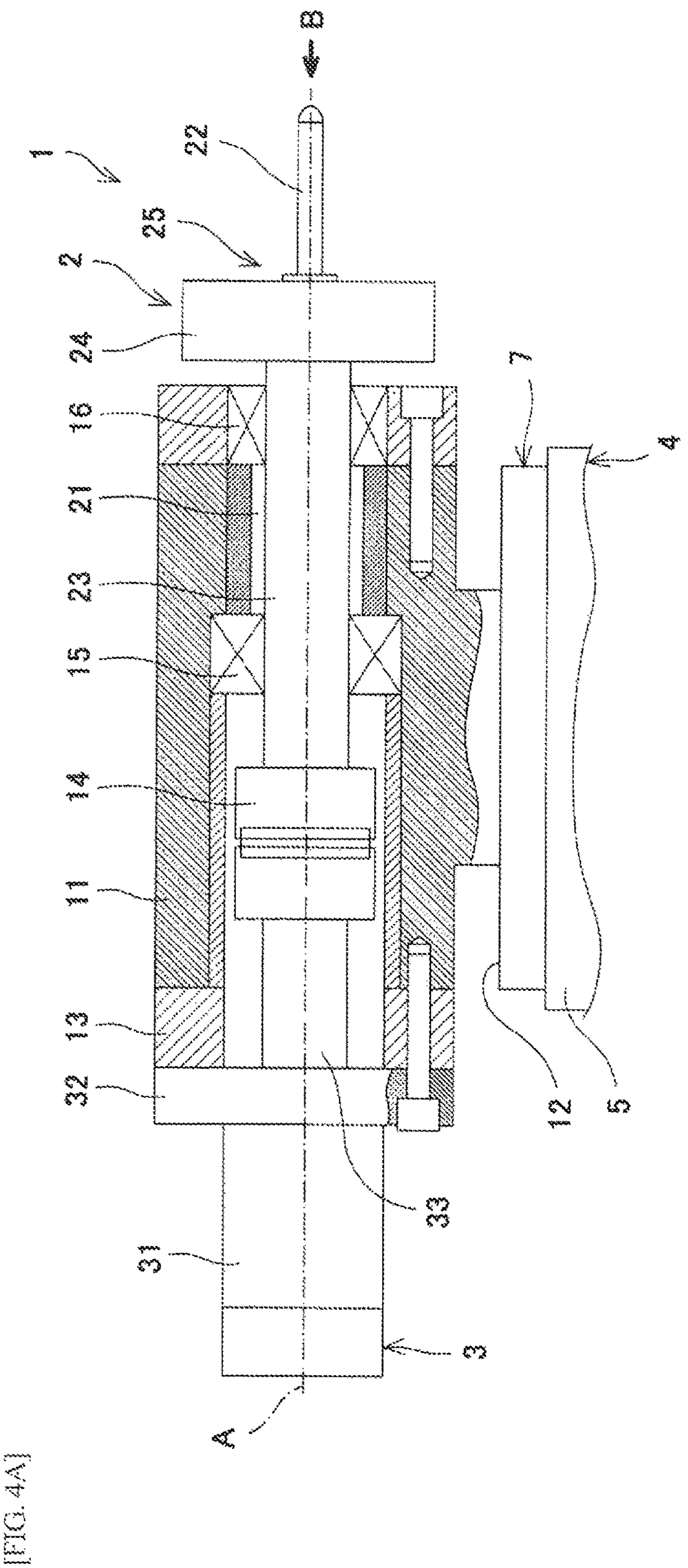
[FIG. 4A]
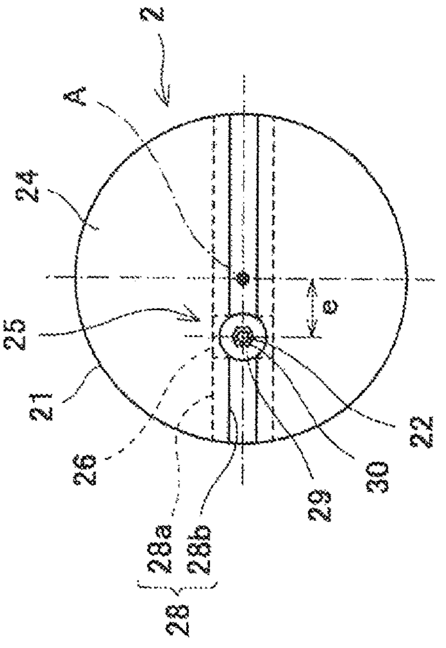
[FIG. 4B]

[FIG. 5A]
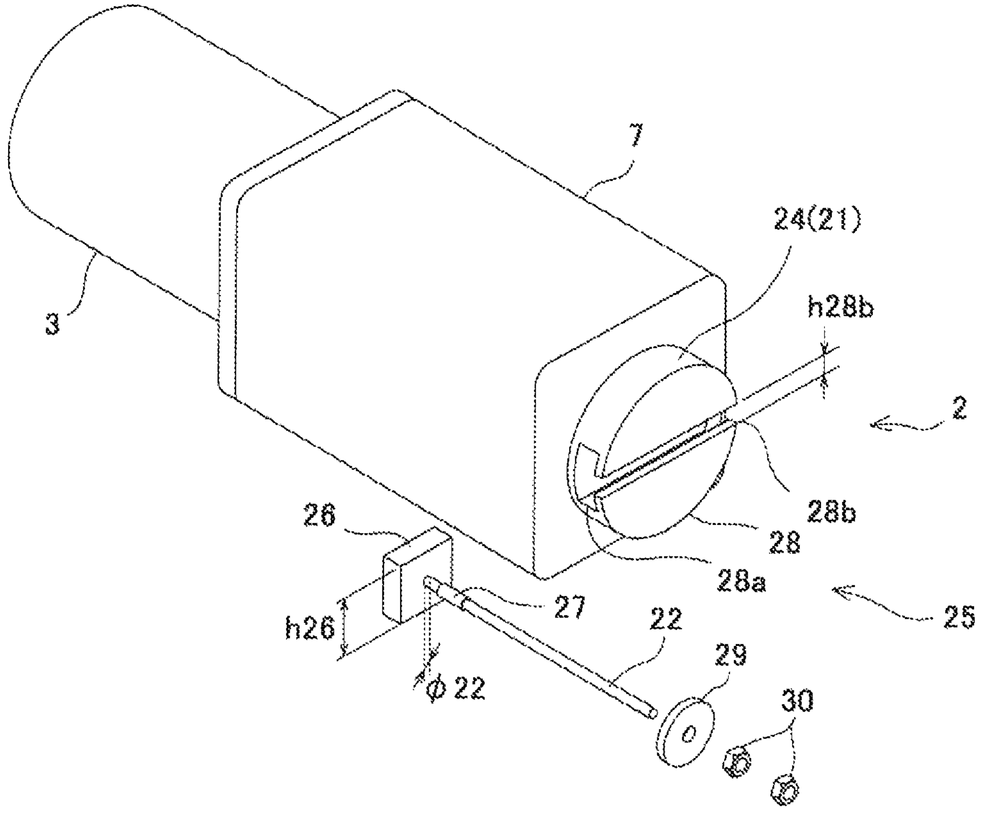
[FIG. 5B]
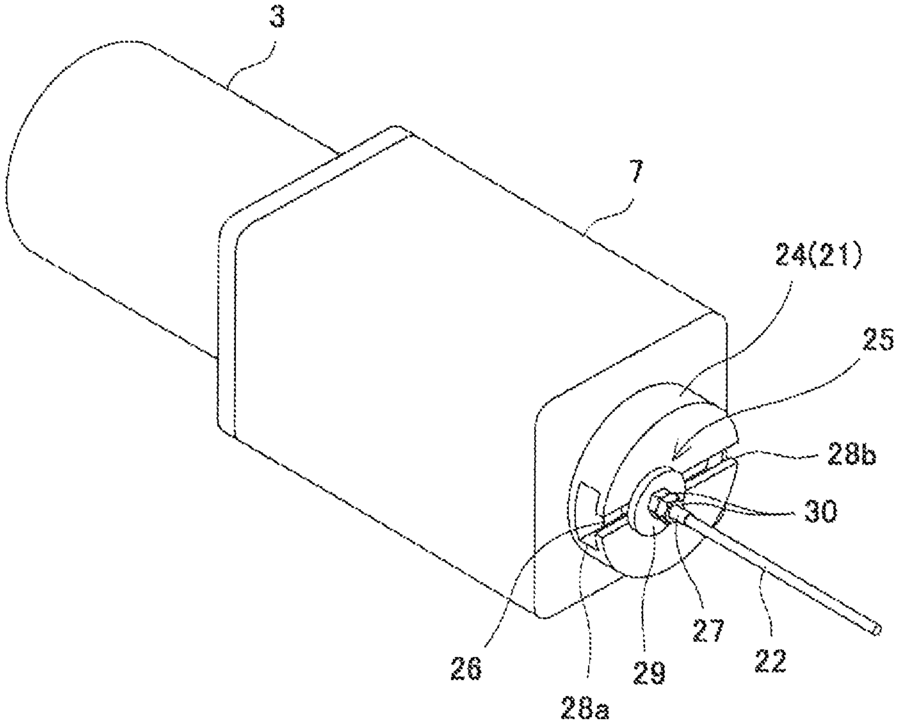

[FIG. 6]
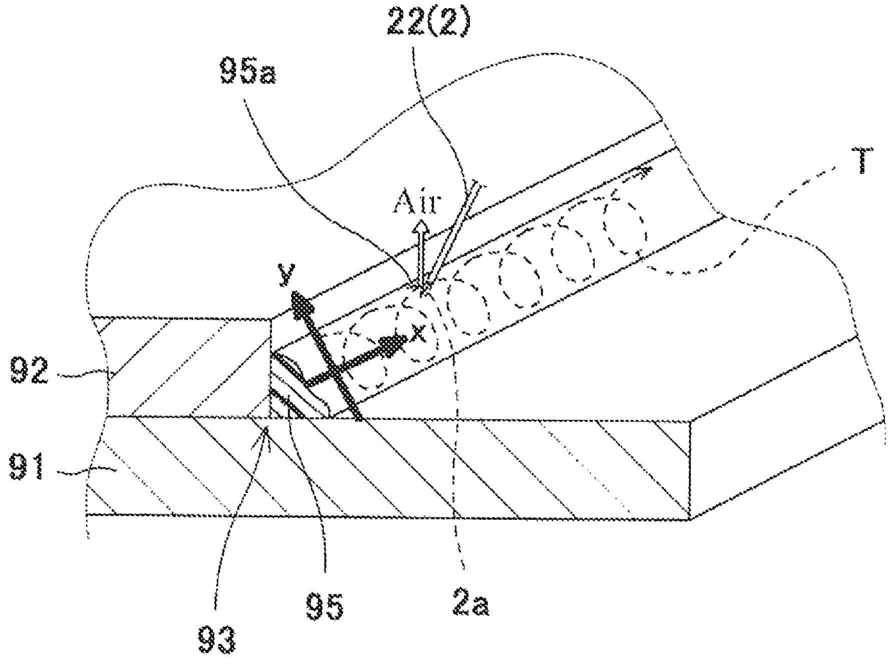

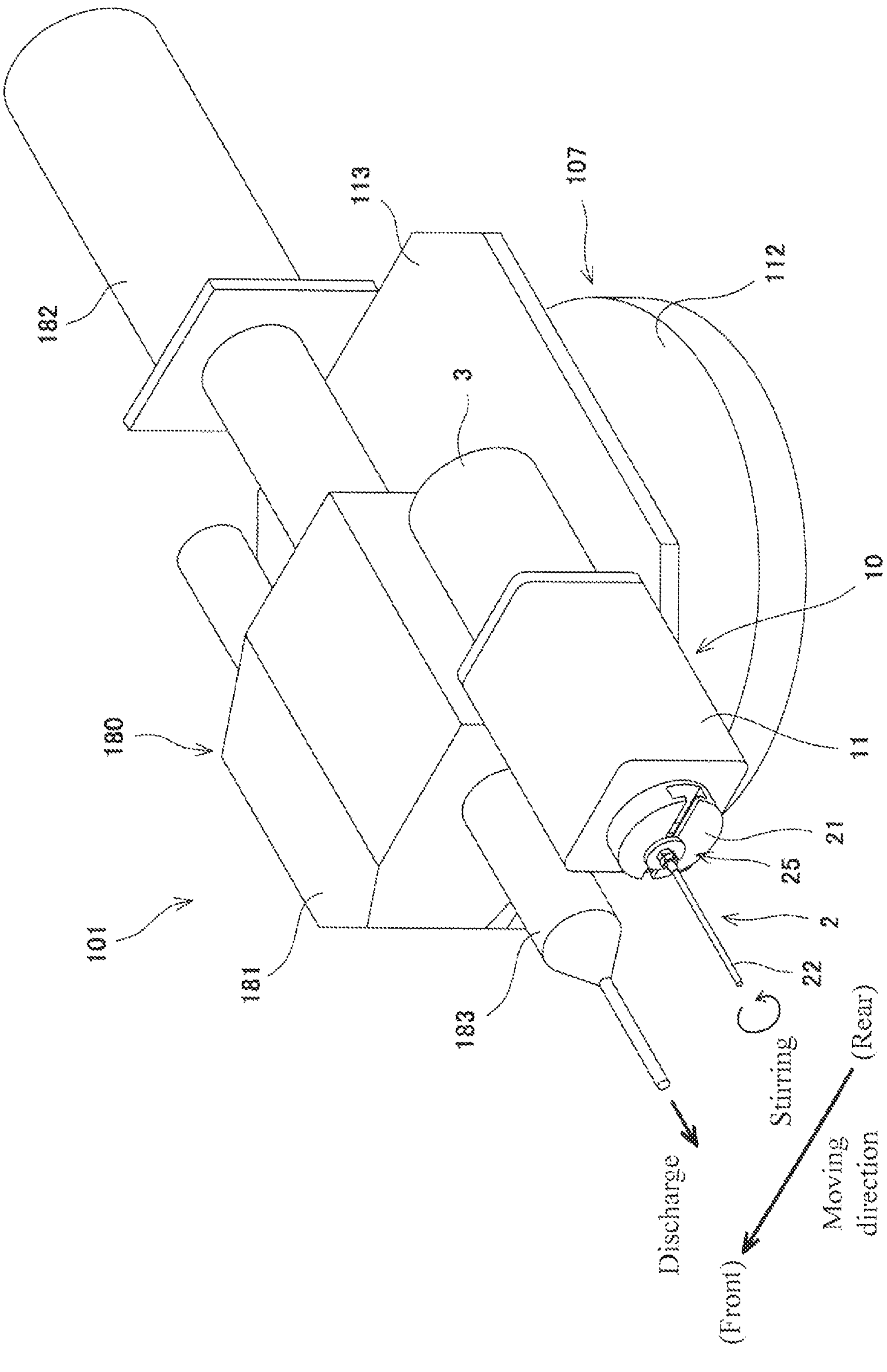
[FIG. 7]

VISCOUS MATERIAL STIRRING APPARATUS AND VISCOUS MATERIAL STIRRING METHOD

TECHNICAL FIELD

The present invention relates to an apparatus and a method for stirring a viscous material such as a sealant or an adhesive.

BACKGROUND ART

At a manufacturing site of vehicles or industrial machinery, automation of work of applying a viscous material to a joining part of two components is underway. For example, PTL 1 discloses a viscous material coating apparatus that can be applied to an automobile manufacturing site. This apparatus includes a mixing head attached to a robot hand and discharging a sealant while moving along a predetermined locus.

CITATION LIST

Patent Literature

PTL 1: JP 6-269720 A

SUMMARY OF INVENTION

Technical Problem

In some situations, air may get inside the applied viscous material. In order to improve or stabilize construction quality, in viscous material coating work, work of bleeding air that has entered inside the viscous material may be performed incidentally.

This incidental work is performed manually by a worker at the manufacturing site, which places a heavy burden on the worker. In order to stably maintain the construction quality under such circumstances, it is essential to train workers skilled in the incidental work, but this requires a great deal of time and money.

Therefore, an object of the present invention is to provide an apparatus and a method that contribute to labor saving of work accompanying viscous material coating work.

Solution to Problem

A viscous material stirring apparatus according to one aspect of the present invention that is an apparatus for stirring a viscous material applied to workpieces, the viscous material stirring apparatus including: a stirring member that rotates around a rotation axis and has a tip radially separated from the rotation axis; a rotary actuator that rotates the stirring member about the rotation axis; a moving mechanism that moves the stirring member, and a control device, in which the control device is configured so that the moving mechanism is driven to immerse the tip of the stirring member in the applied viscous material, that the rotary actuator is driven to rotate the stirring member about the rotation axis, and that the moving mechanism is driven to move the stirring member along a coating direction of the viscous material with the tip of the stirring member immersed in the viscous material.

A viscous material stirring method according to one aspect of the present invention that is a method for stirring a viscous material applied to workpieces, the viscous material stirring method including: moving a stirring member by a moving mechanism to immerse a tip of the stirring member in the applied viscous material, and with the tip of the stirring member immersed in the viscous material, turning the stirring member around a predetermined rotation axis by a rotary actuator, and moving the stirring member along a coating direction of the viscous material by the moving mechanism.

According to the above-described apparatus and method, the stirring member moves in the coating direction of the viscous material while eccentrically rotating with the tip of the stirring member immersed in the viscous material. The applied viscous material is stirred by the tip of the stirring member. Thus, even if air enters inside the viscous material, the air can be extracted from a periphery of the eccentrically rotating stirring member to the outside of the viscous material. In this way, air bleeding work can be automated by operating the rotary actuator and the moving mechanism.

Advantageous Effects of Invention

According to the present invention, an apparatus and a method which contribute to labor saving of work accompanying viscous material coating work can be provided.

BRIEF DESCRIPTION OF DRAWINGS

FIG. 1A is an explanatory view of viscous material coating work performed at a manufacturing site to which an apparatus and a method for stirring a viscous material according to Embodiment 1 are applied.

FIG. 1B is an explanatory view of an air bleeding work performed at the manufacturing site, and is a view illustrating a step of immersing a tip of a stirring member in the viscous material.

FIG. 2 is a conceptual view showing the viscous material stirring apparatus according to Embodiment 1.

FIG. 3 is a block diagram showing the viscous material stirring apparatus according to Embodiment 1.

FIG. 4A is a cross-sectional view of a holding member according to Embodiment 1.

FIG. 4B is a view taken in a direction of arrow B in FIG. 4A, that is, a view showing the stirring member viewed in a direction of its rotation axis.

FIG. 5A is an exploded perspective view of an eccentric amount adjusting mechanism, and FIG. 5B is a perspective view showing the eccentric amount adjusting mechanism in an assembled state.

FIG. 6 is an explanatory view of viscous material stirring work, and is a view showing steps of turning the tip of the stirring member and moving the stirring member.

FIG. 7 is a perspective view showing a holding member of a viscous material stirring apparatus according to Embodiment 2.

DESCRIPTION OF EMBODIMENTS

Hereinafter, embodiments will be described with reference to the drawings. The same or corresponding elements are denoted by the same reference signs throughout the drawings, and redundant detailed description will be omitted.

Embodiment 1

FIGS. 1A and 1B show a manufacturing site to which a viscous material stirring apparatus 1 (hereinafter, simply referred to as "stirring apparatus 1") according to Embodiment 1 is applied. In this manufacturing site, a viscous material 95 is applied to a joining part 93 of workpieces 91 and 92 formed by overlapping or abutting the two workpieces 91 and 92.

<Manufacturing Site>

As an example of a manufacturing site, a manufacturing site of a vehicle (for example, an aircraft or an automobile) or industrial machinery (for example, a construction machine, an agricultural machine, or a machine tool) can be cited.

<Workpiece>

In the present embodiment, as an example, the workpieces 91 and 92 are plate-shaped, and the joining part 93 is formed by overlapping the workpieces 91 and 92. The joining part 93 is formed by a surface of the first workpiece 91 and a side end surface of the second workpiece 92, forms a right angle, and extends along the side end surface of the second workpiece 92. At an aircraft manufacturing site, the workpieces 91 and 92 may be segments constituting a cylindrical fuselage.

<Viscous Material>

The viscous material 95 is a material having viscosity such as a sealant or an adhesive. As an example, the viscous material 95 has a viscosity of 1500 to 2000 Pa·s when applied under a normal temperature environment (for example, 20 to 25° C.). However, both the sealant and the adhesive harden (the viscosity increases) with the lapse of time after being applied to the joining part 93 due to influence of moisture or heating at the manufacturing site.

<Coating Work>

FIG. 1A shows work of applying the viscous material 95. As shown in FIG. 1A, a discharge head 80 that discharges the viscous material 95 is used in the work of applying the viscous material 95. By a head moving mechanism (not shown), the discharge head 80 can be moved close to or away from the joining part 93, and can be moved in an extending direction of the joining part 93. In the coating work, while the discharge head 80 is operated to discharge the viscous material 95 to the joining part 93, the head moving mechanism is operated to move the discharge head 80 in the extending direction of the joining part 93 while appropriately maintaining a clearance between the discharge head 80 and the joining part 93. By adjusting discharge speed and moving speed, an amount (a volume or weight) of the viscous material 95 applied to the joining part 93 while the discharge head 80 moves by the unit distance is adjusted to fall within a range required for a product. Hereinafter, the amount is referred to as "coating amount".

By this coating work, the viscous material 95 is applied along the extending direction of the joining part 93. In the present embodiment, the viscous material 95 is provided so as to straddle the surface of the first workpiece 91 and the side end surface of the second workpiece 92, and is provided in a bead shape along the extending direction of the joining part 93. Thus, the viscous material 95 fills a gap between the workpieces 91 and 92. Hereinafter, the extending direction of the viscous material applied in the bead shape is also referred to as "coating direction".

As shown in a cross section of the viscous material 95 in FIG. 1B, when viewed from outside, even if the viscous material 95 is provided so as to straddle the two workpieces 91 and 92 as described above, air 96 may enter an inside thereof. In that case, a contact area of the viscous material 95 with the workpieces 91 and 92 becomes smaller than expected. Then, the viscous material 95 is easily peeled off from the workpieces 91 and 92, and a period in which required performance (for example, sealing performance or joining performance) can be obtained satisfactorily may be shorter than expected. Note that, as an example of a situation in which the air 96 enters, a case where a coating amount required for a product is large can be cited.

At this manufacturing site, after the work of applying the viscous material 95, work of bleeding the air 96 that has entered the inside of the viscous material 95 is performed incidentally. Previously, the air bleeding work has been manually performed by an operator using a comb tool made of wood or synthetic resin, but the stirring apparatus 1 is applied to the manufacturing site for automation of the air bleeding work.

<Viscous Material Stirring Apparatus>

The stirring apparatus 1 includes a stirring member 2. The stirring member 2 rotates around a rotation axis A, and its tip is radially separated from the rotation axis A. The stirring apparatus 1 causes the tip of the stirring member 2 to be immersed in the viscous material 95 applied to the joining part 93 in the coating work, and in this state, causes the stirring member 2 to turn around the rotation axis A and move the stirring member 2 along the coating direction. Here, the "turn" includes not only rotation about the rotation axis Abut also revolution about the rotation axis A or eccentric rotation about the rotation axis A. Thereby, the air 96 that has entered the inside of the viscous material 95 can be removed, whereby the viscous material 95 properly contacts the workpieces 91 and 92, and a service life of the viscous material 95 is extended (a repair frequency is reduced). Hereinafter, a configuration and operation of the stirring apparatus 1 will be described in more detail.

FIG. 2 is a conceptual view showing the stirring apparatus 1, and FIG. 3 is a block diagram showing the stirring apparatus 1. As shown in FIGS. 2 and 3, the stirring apparatus 1 includes a rotary actuator 3, a moving mechanism 4, and a control device 8, in addition to the stirring member 2 described above. The rotary actuator 3 rotates the stirring member 2 around the rotation axis A. The rotary actuator 3 is configured by, for example, an electric motor. The moving mechanism 4 moves the stirring member 2. The moving mechanism 4 is, for example, a vertical articulated robot, and includes a robot arm 5 having a plurality of (e.g., six) joints and a plurality (the same number of joints) of moving actuators 6 (see FIG. 3) each driving each of the plurality of joints.

In the present embodiment, the stirring member 2 and the rotary actuator 3 are unitized by being held by a holding member 7, and the stirring member 2, the rotary actuator 3, and the holding member 7 constitute a stirring head 10. The holding member 7 is detachably attached to a tip of the robot arm 5. When the robot arm 5 of the moving mechanism 4 operates, the holding member 7 and the stirring member 2 held by the holding member 7 move together with the rotary actuator 3.

As an example, a base of the robot arm 5 is installed on a floor of a work site. The workpieces 91 and 92 are held by a jig 90 installed on the floor of the manufacturing site, and positioned within a movable range of the robot arm 5. However, the base of the robot arm 5 may be slidably supported by a traveling rail installed on the floor of the manufacturing site, in which case the moving mechanism 4 includes the traveling rail and a traveling actuator that causes the robot arm 5 to travel along the traveling rail. The base of the robot arm 5 may be supported by a pedestal installed on the floor of the manufacturing site.

As shown in FIG. 3, the rotary actuator 3 and the moving actuator 6 of the moving mechanism 4 are controlled by the control device 8. The control device 8 is, for example, a computer having a memory such as a ROM or a RAM and a CPU, and a program stored in the ROM is executed by the CPU. The control device 8 may be a single device or may be divided into a plurality of devices.

In the present embodiment, the program stored in the ROM includes a program that teaches a movement locus and moving speed of the tip of the robot arm 5, and execution of the program (i.e., playback) can cause the holding member 7 and the stirring member 2 held by this to move as taught in advance. The program stored in the ROM includes a program for deriving a command value of rotation speed of the rotary actuator 3, and the rotation speed of the rotary actuator 3 and thus the stirring member 2 is controlled by executing the program.

The control device 8 is connected to an operation panel 9. The operation panel 9 is operated by an operator at the manufacturing site. When a command to start the air bleeding work is input by the operator at the operation panel 9, the CPU of the control device 8 executes the above-described program, and the stirring member 2 is turned and moved.

<Stirring Head>

FIG. 4A is a cross-sectional view of the holding member 7 according to Embodiment 1. As shown in FIG. 4A, the holding member 7 has a holding unit 11 for holding the stirring member 2 and the rotary actuator 3 and a mounting unit 12 integrated with the holding unit 11. Although not shown in detail, the mounting unit 12 is formed in a disk shape and is detachably attached to the tip of the robot arm 5. The holding unit 11 is formed in a tubular shape with both ends opened. The holding unit 11 may be a cylinder other than the illustrated rectangular tube.

When the rotary actuator 3 is configured by the electric motor as described above, the rotary actuator 3 includes a housing 31 containing a rotor and a stator, a flange 32 provided at one end of the housing 31, and an output shaft 33 protruding from the flange 32 to a side opposite to the housing 31. The rotary actuator 3 is held by the holding member 7 by fastening the flange 32 to one end of the holding unit 11 in a state in which the output shaft 33 is inserted into the holding unit 11 through one end opening of the holding unit 11. A spacer 13 may be interposed between the holding unit 11 and the flange 32.

The stirring member 2 includes a driven body 21 and a stirring body 22. In the present embodiment, the driven body 21 has a driven shaft 23 and a disk body 24. The driven shaft 23 is partially accommodated in the holding unit 11 through another end opening of the holding unit 11, and one end of the driven shaft 23 is connected to the output shaft 33 of the rotary actuator 3 via a shaft coupling 14 in the holding unit 11. Another end of the driven shaft 23 is located outside the holding unit 11. The driven shaft 23 is rotatably supported by bearings 15 and 16 provided in the holding unit 11. The disk body 24 is fixed to the other end of the driven shaft 23, and is positioned outside the holding unit 11. The stirring body 22 is attached to the disk body 24 of the driven body 21 and protrudes from the disk body 24 to a side opposite to the driven shaft 23 and the rotary actuator 3. The stirring body 22 forms a tip of the stirring member 2.

In the present embodiment, the output shaft 33, the driven shaft 23, and the disk body 24 are coaxially arranged, and a central axis thereof forms the rotation axis A of the stirring member 2. However, the output shaft 33 does not have to be arranged coaxially with the driven shaft 23. For example, the two shafts 33 and 23 may be connected via an orthogonal shaft gear or a staggered shaft gear. In this case, the gear can be provided with a speed reducing function. However, even in a case of the coaxial arrangement, the speed reducing function may be provided by interposing a strain wave gearing.

When the rotary actuator 3 operates and the output shaft 33 rotates, the stirring member 2 (the driven body 21 and the stirring body 22) is driven to rotate around the rotation axis A. The stirring body 22 is attached to the disk body 24 via an eccentric amount adjusting mechanism 25, and as shown in FIG. 4B, a tip of the stirring body 22 (that is, the tip of the stirring member 2) is radially away from the rotation axis A. When the stirring member 2 rotates around the rotation axis A, if the tip of the stirring body 22 is focused, this tip revolves or rotates eccentrically around the rotation axis A. Hereinafter, a radial distance of the tip of the stirring member 2 from the rotation axis A is referred to as "eccentric amount e". The eccentric amount adjusting mechanism 25 can adjust a mounting position of the stirring body 22 to the driven body 21 (disk body 24), which thereby can adjust the eccentric amount e [mm]. As an example, the eccentric amount e can be adjusted within a range of 0 to 10 mm.

<Eccentric Amount Adjusting Mechanism>

FIG. 5A is an exploded perspective view of the eccentric amount adjusting mechanism 25, and FIG. 5B is a perspective view showing the eccentric amount adjusting mechanism 25 in an assembled state. As an example, the eccentric amount adjusting mechanism 25 includes a slider 26 and a male screw 27 provided on the stirring body 22, and a groove 28 provided on the disk body 24. The eccentric amount adjusting mechanism 25 further includes a washer 29 and nuts 30.

The stirring body 22 is formed in a rod shape and extends linearly, for example. The tip of the stirring body 22 is tapered. In the illustrated example, it is formed in a hemispherical shape and rounded, but may be formed in a conical shape and sharpened.

The slider 26 is fixed to a base end of the stirring body 22. In other words, the stirring body 22 is provided so as to protrude from a center of the slider 26. As an example, the slider 26 is formed in a square block shape when viewed in a direction of the rotation axis A. The male screw 27 is located at the base end of the stirring body 22 and slightly closer to the tip side thereof than the slider 26, and is provided on an outer peripheral surface of the stirring body 22.

The groove 28 is formed linearly along a diameter direction of the disk body 24 (one direction orthogonal to the rotation axis A). The groove 28 includes a penetrating part **28*a* that extends linearly inside the disk body 24 and opens through a peripheral surface of the disk body 24 and an opening part 28*b* formed on an end surface of the disk body 24 to open the penetrating part 28*a* outside the disk body 24. The penetrating part 28*a* and the opening part 28*b* are parallel. The slider 26 is received inside the penetrating part 28*a* through an opening formed on the peripheral surface of the disk body 24, and is slidable in an extending direction of the groove 28 in the penetrating part 28*a*. A height h28*b* of the opening part 28*b* is smaller than a height h26 of the slider 26 and larger than an outer diameter φ22 of the stirring body 22. Therefore, when the slider 26 is received by the penetrating part 28*a*, the stirring body 22 can protrude out of the disk body 24 through the opening part 28*b*, whereas the slider 26** is prevented from falling off.

When the slider 26 is received inside the penetrating part **28*a*, the male screw 27 is positioned outside the disk body 24 and near the end surface of the disk body 24. The washer 29 is inserted through the stirring body 22 from the tip side of the stirring body 22, and then the nuts 30 are fastened to the male screw 27. By this fastening, the disk body 24 is sandwiched between the slider 26 and the washer 29, and the stirring body 22 is fixed to the driven body 21. A through bolt type fastening structure is employed, and the slider 26 has the same function as a bolt head in the fastening structure. Before the fastening, a position of the slider 26 in the penetrating part 28***a* is adjusted while sliding the slider 26, thereby adjusting the eccentric amount e (see FIG. 4B). The eccentric amount e can be changed in accordance with a coating amount of the viscous material 95 to be subjected to air bleeding work, and air can be removed regardless of the coating amount of the viscous material 95. Since a double nut type fastening structure is employed, the screw is not easily loosened, and the eccentric amount e after the fastening can be prevented from undesirably changing.

<Air Bleeding Work>

Air bleeding work using the stirring apparatus 1 having the above configuration starts when a command is input by an operator on the operation panel 9. Note that operation of the actuator described below is based on the control of the control device 8. When the command is input, the moving actuator 6 operates, a posture of the robot arm 5 and a position and a posture of the stirring member 2 change, and the tip of the stirring member 2 faces a stirring start position of the viscous material 95 applied to the joining part 93 as a result of the coating work (see FIG. 1B or 2). When the viscous material 95 is applied in a line segment shape having both ends, the stirring start position is any end of the viscous material 95. The viscous material 95 may be applied in a closed loop shape. In this case, the stirring start position is an arbitrary position of the viscous material 95 or a starting point/end point position of the coating work.

The moving actuator 6 continues to operate, and the tip of the stirring member 2 is immersed at the above-described stirring start position of the applied viscous material 95 (see FIG. 1B or FIG. 6). The tip of the stirring member 2 (stirring body 22) forms an immersion part 2*a* immersed inside the viscous material 95 (see FIG. 6).

Referring to FIG. 6, after this immersion step, the rotary actuator 3 operates, and the stirring member 2 turns around the rotation axis A. At the same time, the moving actuator 6 operates, and the stirring member 2 moves along the coating direction of the viscous material 95 while the tip of the stirring member 2 is immersed in the viscous material 95. The immersion part 2*a* moves in the coating direction from the stirring start position while rotating eccentrically with respect to the rotation axis A. A movement locus T of the immersion part 2*a* is a series of a plurality of ellipses arranged in the coating direction.

The turning and moving steps of the stirring member 2 are performed until the immersion part 2*a* reaches a stirring end position of the viscous material 95. When the viscous material 95 is applied in a line segment shape, the stirring end position is an end of the viscous material 95 opposite to the stirring start position. When the viscous material 95 is applied in a closed loop shape, the stirring end position is the same as the stirring start position. When the immersion part 2*a* moves to the stirring end position, the moving actuator 6 operates to retreat the stirring member 2 from the viscous material 95. In this retreat step, before or during the retreat movement by the moving actuator 6, the rotary actuator 3 stops and the turn of the stirring member 2 stops.

When the stirring member 2 is turned and moved while the tip of the stirring member 2 is immersed in the viscous material 95, the immersion part 2*a* moves along the movement locus T while pushing away the viscous material 95. Accordingly, the viscous material 95 is stirred by the immersion part 2*a*. In the viscous material 95, a passage mark 95*a* of the immersion part 2*a* is formed on a downstream side of the movement locus T with respect to the immersion part 2*a*. The air that has entered the inside of the viscous material 95 flows out of the viscous material 95 around the immersion part 2*a*, particularly through the passage mark 95*a*.

The rotary actuator 3 rotates the stirring member 2 at a constant rotation speed n [rpm] (an angular velocity ω [rad/s] of the stirring member 2 is 2πn/60). The moving actuator 6 moves the stirring member 2 at a constant moving speed v [mm/s]. In this case, when a two-dimensional orthogonal coordinate system in which the coating direction is an x direction and a direction orthogonal to the coating direction and the direction of the rotation axis A is a y direction is assumed, the movement locus T of the immersion part 2*a* is represented in the following equation (1).

$$x=e\cos\omega t+vt,\ y=e\sin\omega t \qquad (1)$$

Here, t is elapsed time [s] from the start of rotation and movement of the immersion part 2*a*, and x is an x coordinate and y is a y coordinate after t seconds from the start of rotation and movement of the immersion part 2*a* Note that e, ω, and v are the above-described eccentric amount [mm], angular velocity [rad/s], and moving speed [mm/s].

As an example, the rotation speed n is set within a range of 50 to 100 rpm. By setting the speed relatively low in this way, the applied viscous material 95 is not disturbed, and the viscous material 95 can be stirred while maintaining a state in which the viscous material 95 is applied to the joining part 93. In this case, if the moving speed v is too low, the movement locus T will be like a plurality of ellipses overlapping one another, and the viscous material 95 will be disturbed. If the moving speed v is too high, a plurality of ellipses will be arranged at a large interval in the coating direction, and an unstirred region will be created. Therefore, the moving speed v is set so that a plurality of ellipses constituting the movement locus T circumscribes each other, overlaps with a small amount of overlap, or is arranged with a small clearance. As an example, the moving speed v is set in a range of 0.1 to 15 m/min (1.7 to 250 mm/s). Thereby, the air 96 can be uniformly discharged without disturbing the viscous material 95 regardless of the position in the coating direction.

As described above, in the present embodiment, the air bleeding work that has been performed manually until now can be automated. For this reason, it contributes to labor saving of work accompanying the viscous material coating work.

Embodiment 2

FIG. 7 is a perspective view showing a holding member 107 of a stirring apparatus 101 according to Embodiment 2. In the present embodiment, the stirring head 10 (unit including the stirring member 2, the rotary actuator 3, and the holding unit 11 of the holding member 7) according to Embodiment 1 is mounted on a base 113 of the holding member 107. A discharge head 180 is mounted on the base 113 adjacent to the stirring head 10. The discharge head 180 has a housing 181, a discharge actuator 182, and a nozzle 183. Although not shown in detail, the housing 181 has a storage unit that stores a viscous material, a plunger that pushes the viscous material stored in the storage unit to the nozzle 183, and the like. The nozzle 183 discharges the viscous material supplied from the storage unit. The discharge actuator 182 is a power source of the plunger. When the discharge actuator 182 operates, the viscous material is discharged from the nozzle 183. The discharge actuator 182 is configured by, for example, an electric motor.

A mounting unit 112 of the holding member 107 is integrated with the base 113, and is detachably attached to a moving mechanism (for example, a tip of a robot arm of a vertical articulated robot) in the same manner as in Embodiment 1.

In the stirring apparatus 101 according to the present embodiment, the stirring head 10 for performing air bleeding work and the discharge head 180 for discharging the viscous material are unitized. Therefore, coating work and the air bleeding work can be performed in parallel.

Although not shown in detail, the stirring apparatus 101 according to Embodiment 2 also includes a control device 8 and an operation panel 9 (see FIG. 3) in the same manner as in Embodiment 1. When a work start command is input on the operation panel 9, the control device 8 performs the viscous material coating work and the air bleeding work.

In other words, the control device 8 drives the moving mechanism to move the holding member 107 so that the discharge head 180 is on a front side in a moving direction of the holding member 107 and the stirring member 2 is on a rear side in the moving direction of the holding member 107. In a process of moving the holding member 107, the control device 8 drives the discharge head 180 (discharge actuator 182) to apply the viscous material to workpieces, and drives the rotary actuator 3 to rotate the stirring member 2 around a rotation axis A. This allows the viscous material to be stirred in the same manner as in Embodiment 1 by immersing a tip of the stirring member 2 in the viscous material immediately after being applied while performing the work of applying the viscous material to a joining part of the workpieces. Since the coating work and the air bleeding work can be performed in parallel, production efficiency at a manufacturing site is improved.

Modifications

The embodiments have been described above, but the above configurations can be appropriately changed, added, and/or deleted within the scope of the present invention.

The stirring member 2 only needs to have its tip radially away from the rotation axis A, and a shape of the stirring body 22 is not limited to a rod shape. As an example, the stirring body 22 may have a crank shape. In the steps of turning and moving the stirring member 2, the rotation speed n and the moving speed v may be changed.

The holding member 7 can be omitted. When the moving mechanism 4 is a vertical articulated robot and a joint closest to the tip side is a torsion shaft (so-called T shaft), the stirring member 2 may be detachably attached to the tip of the robot arm 5. In this case, of the plurality of actuators that drives the joints of the vertical articulated robot, the actuator corresponding to the joint closest to the tip side functions as the rotary actuator 3 that drives the stirring member 2 to rotate, and the remaining actuators function as the moving actuators 6 that move the stirring member 2. Note that the moving mechanism 4 is not limited to the vertical articulated robot.

REFERENCE SIGNS LIST

1, 101 viscous material stirring apparatus
2 stirring member
3 rotary actuator
4 moving mechanism
7, 107 holding member
13
8 control device
25 eccentric amount adjusting mechanism
80,180 discharge head
91, 92 workpiece
95 viscous material
A rotation axis
e eccentric amount

The invention claimed is:

1. A viscous material stirring apparatus that is an apparatus for stirring a viscous material applied to workpieces, the viscous material stirring apparatus comprising:
- a stirring member that is configured to rotate around a rotation axis and has a tip radially separated from the rotation axis;
- a rotary actuator that is configured to rotate the stirring member about the rotation axis;
- a moving mechanism that is configured to move the stirring member; and
- a control device,
- wherein the control device is configured so that
- the moving mechanism is driven to immerse the tip of the stirring member in the applied viscous material, and
- the rotary actuator is driven to rotate the stirring member about the rotation axis, and the moving mechanism is driven to move the stirring member along a coating direction of the viscous material with the tip of the stirring member immersed in the viscous material such that a movement locus of the tip of the stirring member in the viscous material is a series of a plurality of ellipses arranged in the coating direction of the viscous material.

2. The viscous material stirring apparatus according to claim 1, wherein the stirring member is provided with an eccentric amount adjusting mechanism that is configured to adjust an eccentric amount that is a radial distance of the tip from the rotation axis.

3. The viscous material stirring apparatus according to claim 1, further comprising a holding member that is configured to hold the stirring member and the rotary actuator,
- wherein the holding member is detachably attached to the moving mechanism.

4. The viscous material stirring apparatus according to claim 3, further comprising a discharge head that is held by the holding member and is configured to discharge the viscous material,
- wherein the control device is configured so that
- the moving mechanism is driven to move the holding member in a posture in which the discharge head is on a front side in a moving direction of the holding member and the stirring member is on a rear side in the moving direction of the holding member, and
- in a process of moving the holding member, the discharge head is driven to apply the viscous material to the workpieces, and the rotary actuator is driven to rotate the stirring member about the rotation axis.

5. A viscous material stirring method that is a method for stirring a viscous material applied to workpieces, the viscous material stirring method comprising:
- moving a stirring member by a moving mechanism to immerse a tip of the stirring member in the applied viscous material, and
- with the tip of the stirring member immersed in the viscous material, turning the stirring member around a predetermined rotation axis by a rotary actuator, and moving the stirring member along a coating direction of the viscous material by the moving mechanism such that a movement locus of the tip of the stirring member in the viscous material is a series of a plurality of ellipses arranged in the coating direction of the viscous material.

* * * * *